(12) United States Patent
Oike

(10) Patent No.: US 11,953,110 B2
(45) Date of Patent: Apr. 9, 2024

(54) VALVE DEVICE

(71) Applicant: TLV CO., LTD., Hyogo (JP)

(72) Inventor: Tadashi Oike, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 0 days.

(21) Appl. No.: 18/340,623

(22) Filed: Jun. 23, 2023

(65) Prior Publication Data

US 2023/0332708 A1    Oct. 19, 2023

Related U.S. Application Data

(63) Continuation of application No. PCT/JP2021/042767, filed on Nov. 22, 2021.

(30) Foreign Application Priority Data

Dec. 25, 2020   (JP) .................................. 2020-217175

(51) Int. Cl.
*F16K 24/04*   (2006.01)
*F16K 27/02*   (2006.01)

(52) U.S. Cl.
CPC ........ *F16K 24/046* (2013.01); *F16K 27/0245* (2013.01)

(58) Field of Classification Search
CPC .. F16T 1/08; F16T 1/22; F16K 24/046; F16K 31/002; F16K 31/22; F16K 27/0245
See application file for complete search history.

(56) References Cited

U.S. PATENT DOCUMENTS

| | | | | |
|---|---|---|---|---|
| 3,489,348 A | * | 1/1970 | Katsuji ..................... | F16T 1/22 236/53 |
| 4,545,397 A | * | 10/1985 | Yumoto ................ | F16K 24/046 236/53 |
| 5,186,203 A | * | 2/1993 | Oike ......................... | F16T 1/22 137/192 |
| 8,302,619 B2 | * | 11/2012 | Oike ......................... | F16T 1/22 236/93 R |

(Continued)

FOREIGN PATENT DOCUMENTS

| | | |
|---|---|---|
| CN | 2033079 U | 2/1989 |
| JP | S59-013197 A | 1/1984 |

(Continued)

OTHER PUBLICATIONS

Written Opinion of the International Searching Authority issued in PCT/JP2021/042767; dated Dec. 28, 2021.

(Continued)

*Primary Examiner* — Hailey K. Do
(74) *Attorney, Agent, or Firm* — Studebaker & Brackett PC

(57) ABSTRACT

A valve device includes: a casing including a valve chamber; a valve seat disposed in the valve chamber and including a valve hole; a float disposed in the valve chamber and movable in accordance with the amount of drain in the valve chamber to thereby open and close the valve hole; and a support supporting the float in the state of being seated on the valve seat and closing the valve hole. The support includes a base including an opening and having a frame shape, and two float seats disposed in the base, and the float in the state of being seated on the valve seat and closing the valve hole is seated on the two float seats.

4 Claims, 5 Drawing Sheets

(56) References Cited

U.S. PATENT DOCUMENTS 9,791,104 B2 * 10/2017 Oike .................. F16T 1/386

FOREIGN PATENT DOCUMENTS

| | | |
|---|---|---|
| JP | S61-204096 U | 12/1986 |
| JP | H04-042996 U | 4/1992 |
| JP | H05-141597 A | 6/1993 |
| JP | H06-185660 A | 7/1994 |
| JP | 2007-032644 A | 2/2007 |
| JP | 2010-144756 A | 7/2010 |
| JP | 2011-064229 A | 3/2011 |
| JP | 2018-123843 A | 8/2018 |

OTHER PUBLICATIONS

International Search Report issued in PCT/JP2021/042767; dated Dec. 28, 2021.
An Examination Report mailed by IP Australia dated Aug. 15, 2023, which corresponds to Australian Patent Application No. 2021406566, and is related to U.S. Appl. No. 18/340,623.
The extended European search report issued by the European Patent Office on Jan. 9, 2024, which correpsonds to European Patent Application No. 21910090.6-1015 and is related to U.S. Appl. No. 18/340,623.

* cited by examiner

VALVE DEVICE

CROSS-REFERENCE TO RELATED APPLICATION

This is a continuation of PCT International Application PCT/JP2021/42767 filed on Nov. 22, 2021, which claims priority to Japanese Patent Application No. 2020-217175 filed on Dec. 25, 2020. The disclosures of these applications including the specifications, the drawings, and the claims are hereby incorporated by reference in their entirety.

FIELD

The technique disclosed here relates to a valve device.

BACKGROUND

In an example valve device, a float is disposed in a valve chamber. A float moves upward and downward in accordance with the amount of drain in the valve chamber to thereby open and close a valve hole. When the float closes the valve hole, the float is seated not only on a valve seat but also on a float seat. Accordingly, the state where the float closes the valve hole is maintained with stability.

SUMMARY

As described above, the float seat has a significant function for seating the float on the valve seat with stability. Thus, when position accuracy of the float seat decreases, stability in seating the float on the valve seat might decrease.

It is therefore an object of the technique disclosed here to enhance stability in seating a float on a valve seat.

A valve device disclosed here includes: a casing including a valve chamber; a valve seat disposed in the valve chamber and including a valve hole: a float disposed in the valve chamber and movable in accordance with an amount of drain in the valve chamber to thereby open and close the valve hole; and a support supporting the float in a state of being seated on the valve seat and closing the valve hole, wherein the support includes a base including an opening and having a frame shape and two float seats disposed in the base, and the float in the state of being seated on the valve seat and closing the valve hole being seated on the two float seats.

The valve device can enhance stability in seating the float on the valve seat.

DESCRIPTION OF EMBODIMENTS

Figure 1:
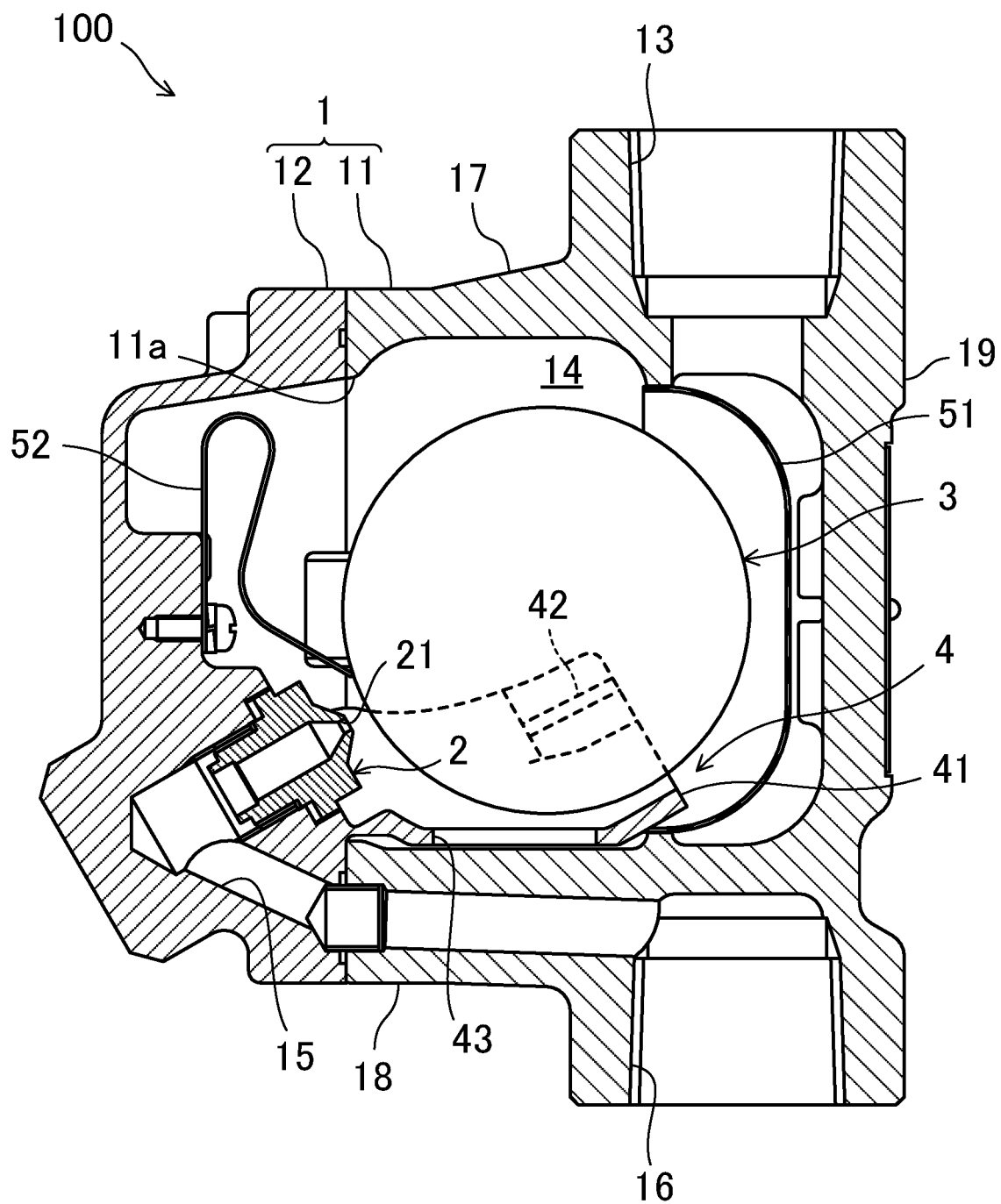
FIG. 1 is a cross-sectional view illustrating a schematic configuration of a valve device.

An exemplary embodiment will be described in detail hereinafter with reference to the drawings. FIG. 1 is a cross-sectional view illustrating a schematic configuration of a valve device 100.

The valve device 100 is a float-type valve device. The valve device 100 includes: a casing 1 including a valve chamber 14; a valve seat 2 disposed in the valve chamber 14 and including a valve hole 21; a float 3 disposed in the valve chamber 14 and movable in accordance with the amount of drain in the valve chamber 14 to thereby open and close the valve hole 21; and a support 4 supporting the float 2 in the state of being seated on the valve seat 2 and closing the valve hole 21. In this example, the valve device 100 is a drain trap (also referred to as a steam trap or a gas trap).

A fluid that flows into the valve device 100 is drain (condensate) and steam. The valve device 100 allows passage of drain and blocks passage of steam. That is, the float 3 opens the valve hole 21 while drain is flowing into the casing 1 and closes the valve hole 21 when stream flows into the casing 1.

Specifically, the casing 1 has a divided structure including a first part 11 and a second part 12. The first part 11 and the second part 12 are fastened with bolts and define a closed container. The valve chamber 14 is disposed in the casing 1. That is, the first part 11 and the second part 12 define the valve chamber 14.

The first part 11 has an opening 11a that opens the valve chamber 14 sideways. The second part 12 is attached to the first part 11 to close the opening 11a.

Specifically, the casing 1 includes a ceiling wall 17, a bottom wall 18, and a peripheral wall 19 coupling the ceiling wall and the bottom wall 18. The ceiling wall 17, the bottom wall 18, and the peripheral wall 19 define the valve chamber 14. The first part 11 includes the ceiling wall 17, the bottom wall 18, and a portion of the peripheral wall 19. The second part 12 includes the other portion of the peripheral wall 19. The portion of the peripheral wall 19 included in the first part 11 includes the opening 11a. The opening 11a is open sideways.

The first part 11 has an inlet 13 through which a fluid flows from outside of the casing 1 into the valve chamber 14. The inlet 13 penetrates the ceiling wall 17 in the top-bottom direction.

The second part 12 and the bottom wall 18 of the first part 11 have an outflow channel 15 and an outlet 16 through which a fluid flows from the valve chamber 14 to the outside of the casing 1. That is, the outflow channel 15 is continuous from the second part 12 to the bottom wall 18. The upstream end of the outflow channel 15 is located in the second part 12 and is open in a lower portion of the valve chamber 14. The downstream end of the outflow channel 15 is the outlet 16. The outlet 16 is open downward in the bottom wall 18. The axis of the inlet 13 and the axis of the outlet 16 substantially coaxially extend in the top-bottom direction.

In the casing 1, a fluid channel is defined by the inlet 13, the valve chamber 14, the outflow channel 15, and the outlet 16. A fluid flows from the inlet 13 into the valve chamber 14, passes through the valve chamber 14, and flows out from the outlet 16 through the outflow channel 15.

The valve seat 2 is disposed in the second part 12. The valve seat 2 is disposed at the upstream end of the outflow channel 15 in the valve chamber 14. That is, the valve seat 2 is disposed in a lower portion of the valve chamber 14. The valve seat 2 is screwed to the upstream end of the outflow channel 15. The valve seat 2 has a valve hole 21 allowing the valve chamber 14 and the outflow channel 15 to communicate with each other.

The float 3 serves as a valve member that opens and closes the valve hole 21. The float 3 has a hollow substantially spherical shape. The float 3 is movably housed in the valve chamber 14. The float 3 is suspended in the valve chamber 14. Thus, the float 3 moves upward and downward in accordance with the amount of drain in the valve chamber 14.

The support 4 includes a base 41 including an opening 43 and having a frame shape and two float seats 42 disposed on the base 41, and the float 3 in the state of being seated on the valve seat 2 and closing the valve hole 21 is seated on the two float seats 42. The valve seat 2 and the two float seats 42 support the float 3 in the state of closing the valve hole 21 at three points.

The base 41 is disposed in the second part 12 in a cantilever manner That is, one end of the base 41 is coupled to the second part 12, and the other end of the base 41 is a free end. Specifically, the base 41 extends inward of the valve chamber 14 from a portion of the second part 12 below the valve seat 2. More specifically, the base 41 and the second part 12 are made of a single member. For example, the second part 12 and the base 41 are integrally formed by casting.

The base 41 is opposed to the bottom wall 18 and a gap is present between the base 41 and the bottom wall 18. The base 41 is disposed below the float 3 in the valve chamber 14.

The two float seats 42 are disposed at the tip of the base 41. The two float seats 42 are disposed on a surface of the base 41 facing the float 3. The valve seat 2 and the two float seats 42 are disposed to form a triangle in order to achieve three-point support of the float 3.

The casing 1 may include a screen 51 that removes foreign substance from a fluid flowing into the valve chamber 14, and a bimetal 52 that forcibly opens the float 3 at start of the valve device 100.

The screen 51 is disposed in the first part 11. The screen 51 is located near the inlet 13 in the valve chamber 14. The screen 51 is a mesh-shaped member such that a fluid such as drain and steam can pass through the screen 51.

The bimetal 52 is disposed in the second part 12. One end of the bimetal 52 is fixed to the second part 12, and the other end of the bimetal 52 is a free end. The bimetal 52 is curved as a whole. The bimetal 52 is deformed in accordance with the temperature of the bimetal 52. When the bimetal 52 is at a low temperature, the free end of the bimetal 52 is located near the valve seat 2 and slightly away from the valve seat 2. The free end of the bimetal 52 at this position causes the float 3 to be separated from the valve seat 2. When the bimetal 52 is at a high temperature, the free end of the bimetal 52 is located close to the valve seat 2. The free end of the bimetal 52 at this position does not hinder sitting of the float 3 on the valve seat 2.

Figure 2:
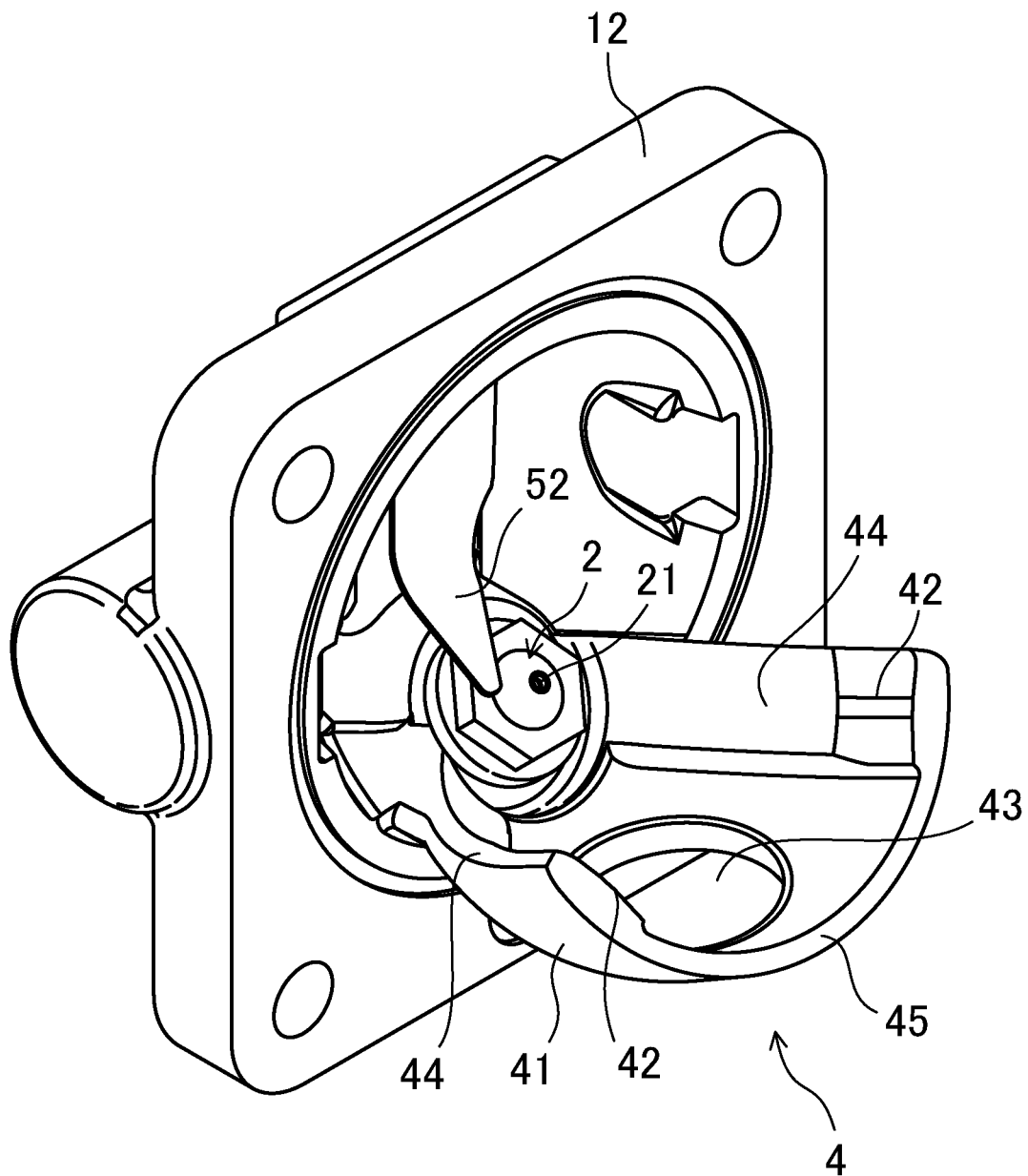
FIG. 2 is a perspective view of a second part.
Figure 3:
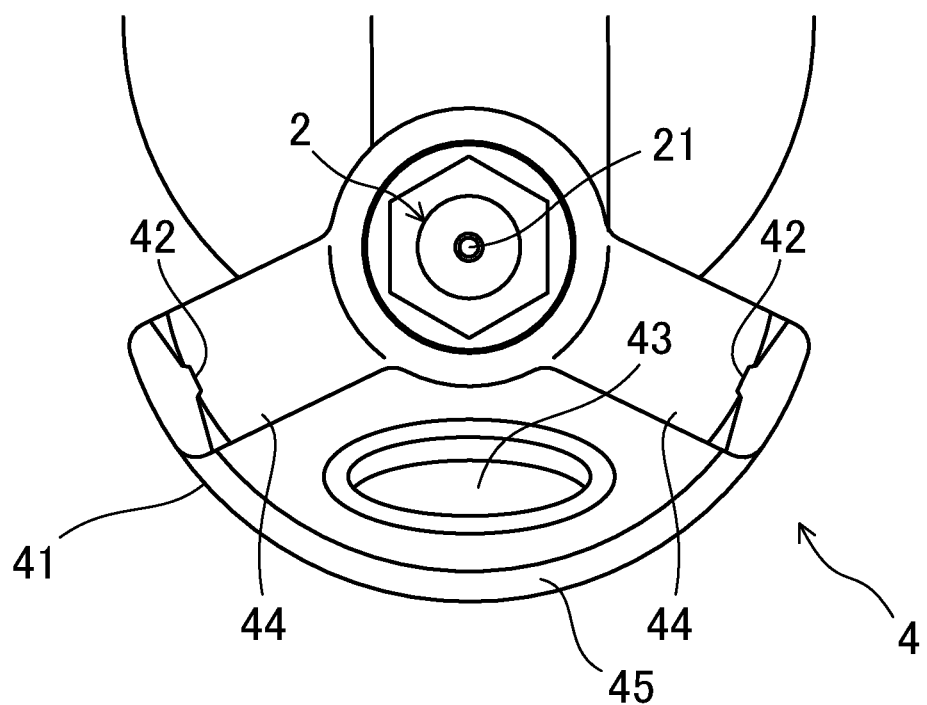
FIG. 3 is a base seen in an axial direction of a valve hole of a valve seat.

With reference to FIGS. 2 and 3, the support 4 will be described in further detail. FIG. 2 is a perspective view of the second part 12. FIG. 3 illustrates the base 41 when seen in an axial direction of the valve hole 21 of the valve seat 2.

The base 41 has a substantially sector shape and is curved to be recessed toward the bottom wall 18. Specifically, the base 41 includes two arms 44 extending from the second part 12, and a plate 45 coupling the two arms 44 to each other. The float seats 42 are disposed at the tips of the arms 44. The substantially circular opening 43 penetrates the plate 45.

The two arms 44, that is, the two float seats 42, are spaced apart from each other in a circumferential direction about the axis of the valve hole 21. Each of the arms 44 extends inward of the valve chamber 14 from the second part 12. That is, one end of each arm 44 in an extension direction thereof is coupled to the second part 12, and the other end of each arm 44 in the extension direction is a free end on the inner side of the valve chamber 14. Each arm 44 is curved to be recessed toward the bottom wall 18. Each arm 44 is thicker than the plate 45.

The float seats 42 are disposed on surfaces of the tips of the arms 44 facing the float 3.

The plate 45 is coupled to the entire area of each arm 44 from one end to the other end in the extension direction. The plate 45 is recessed toward the bottom wall 18.

The arms 44 and the plate 45 are curved not to contact the float 3 seated on the valve seat 2 and the two float seats 42.

Figure 4:
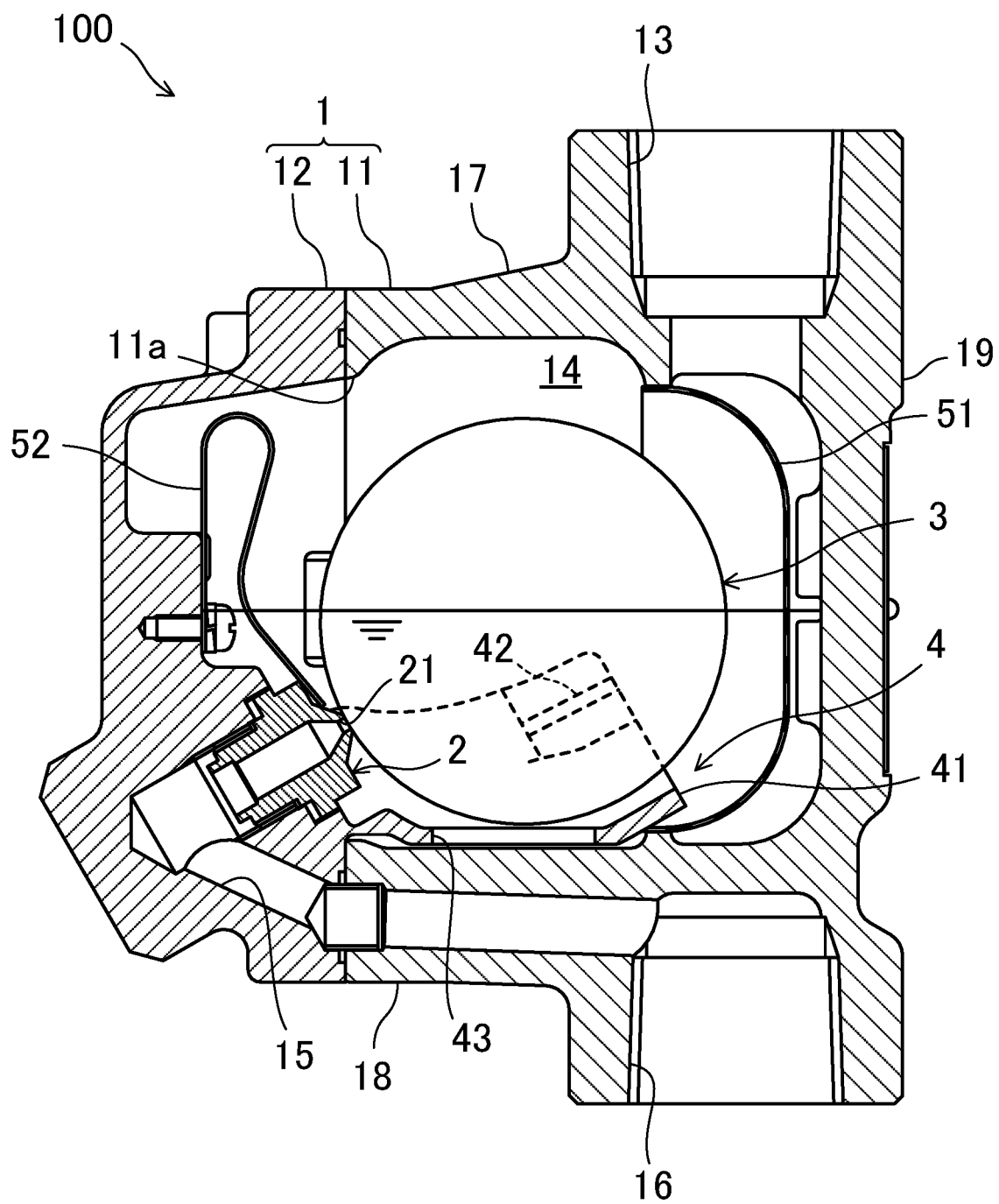
FIG. 4 is a cross-sectional view illustrating a closed state of the valve device.
Figure 5:
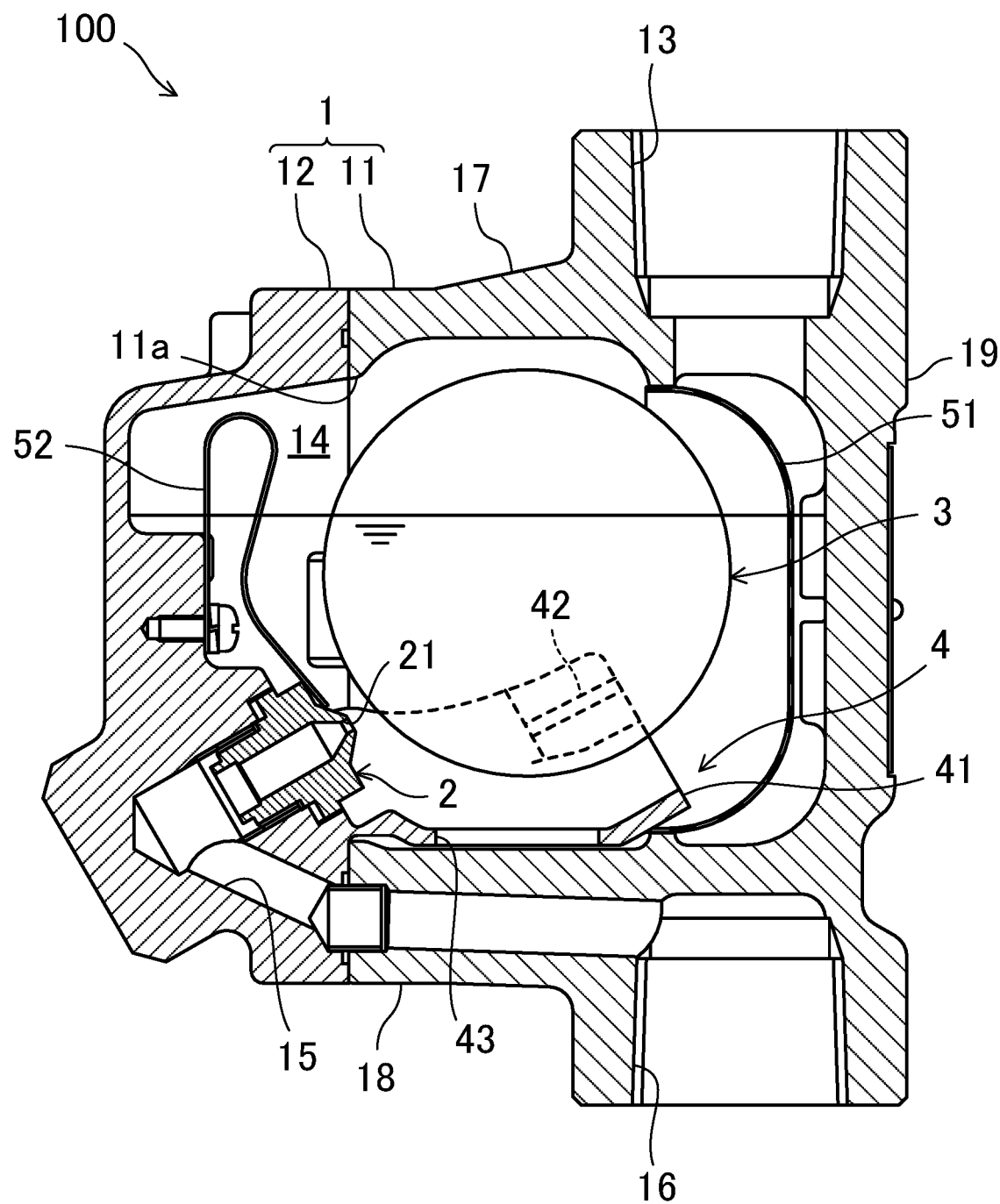
FIG. 5 is a cross-sectional view illustrating an open state of the valve device.

Basic operation of the valve device 100 will be described. FIG. 4 is a cross-sectional view illustrating a closed state of the valve device 100. FIG. 5 is a cross-sectional view illustrating an open state of the valve device 100.

The valve device 100 is disposed in, for example, a pipe of a steam system. Steam and drain distributed in the pipe flow into the valve device 100. At start of the valve device 100, the bimetal 52 is at a relatively low temperature, and the free end of the bimetal 52 is located away from the valve seat 2, as illustrated in FIG. 1. Seating of the float 3 on the valve seat 2 is hindered by the bimetal 52, and the float 3 is forcibly opened. In this state, when air in the pipe (i.e., initial air) or low-temperature drain flows into the valve chamber 14 of the valve device 100, initial air or low-temperature drain flows out of the valve device 100 through the valve hole 21 and the outflow channel 15. In this manner, initial air or low-temperature drain that has flowed into the valve device 100 is quickly discharged from the valve device 100. A fluid such as initial air or low-temperature drain that has flowed from the inlet 13 first passes through the screen 51. At this time, foreign substance is removed from the fluid by the screen 51.

Then, steam or high-temperature drain flows into the valve device 100. The drain is stored in a lower portion of the valve chamber 14, and the steam remains in an upper portion of the valve chamber 14. While the float 3 is in the open state, the drain flows out from the valve chamber 14 through the valve hole 21. Thereafter, when the temperature of the bimetal 52 increases, the bimetal 52 is deformed, and as illustrated in FIG. 4, the free end of the bimetal 52 moves to a position at which seating of the float 3 on the valve seat 2 is not hindered. Accordingly, the float 3 can be seated on the valve seat 2, and can close the valve hole 21. If the amount of drain in the valve chamber 14 is not significantly large, the float 3 is seated on the valve seat 2 and closes the valve hole 21. At this time, the float 3 is also seated on the two float seats 42. That is, the float 3 is supported at three points by the valve seat 2 and the two float seats 42.

When the amount of drain in the valve chamber 14 increases, the float 3 is caused to float by the drain, as illustrated in FIG. 5. Accordingly, the float 3 rises and is released from the valve seat 2 to thereby open the valve hole 21. The drain flows out from the valve chamber 14 into the outflow channel 15 through the valve hole 21. The drain that has flowed from the valve hole 21 passes through the outflow channel 15, and flows out from the valve device 100 through the outlet 16. At this time, since steam in the valve chamber 14 remains in space above the drain in the valve chamber 14, the steam does not flow out from the valve device 100 through the valve hole 21.

When the amount of drain in the valve chamber 14 decreases, the float 3 descends with the decrease of the drain amount, and is seated on the valve seat 2 and closes the valve hole 21, as illustrated in FIG. 4. In this manner, outflow of drain from the valve device 100 stops. At this time, the float 3 is also seated on the float seats 42 as well as the valve seat 2. In the state where the valve hole 21 is closed, the float 3 is supported at three points by the valve seat 2 and the two float seats 42. In this state, even when steam flows into the valve chamber 14, since the valve hole 21 is immersed in drain and the valve hole 21 is closed by the float 3, the steam does not flow out from the valve device 100 through the valve hole 21.

When the amount of drain in the valve chamber 14 increases, the float 3 is caused to rise again by drain. The float 3 is released from the valve seat 2 and opens the valve hole 21.

In the manner described above, in the valve device 100, the float 3 moves upward and downward in accordance with the amount of drain in the valve chamber 14, and the valve hole 21 is opened and closed. Accordingly, drain intermittently passes in the valve device 100. On the other hand, in the cases of both opening and closing the valve, passage of steam through the valve device 100 is inhibited.

The support 4 will now be further described.

The two float seats 42 of the support 4 support the float 3 in the state of being seated on the valve seat 2 and closing the valve hole 21, at three points together with the valve seat 2. Accordingly, the state where the float 3 closes the valve hole 21 is maintained with stability.

The two float seats 42 are disposed on the frame-shaped base 41. Since the base 41 has the frame shape, the base 41 has relatively high rigidity. Thus, deformation of the base 41 is reduced so that the positions of the two float seats 42 can be maintained with high accuracy. For example, suppose a case where an external shock is applied to the valve device 100 in transporting the valve device 100. Even in such a case, since the base 41 has high rigidity, the base 41 is not easily deformed. Thus, in incorporating the valve device 100 in a pipe or other part of the steam system, a work such as a work of deforming the base 41 to adjust the positions of the two float seats 42 becomes unnecessary.

In particular, the configuration of the support 4 described above is effective for a configuration in which the valve seat 2 and the support 4 are disposed in the second part 12 attached to the first part 11 from a side to close the valve chamber 14 that is open sideways. For example, in a configuration in which the valve seat 2 is disposed in the second part 12 and float seats are disposed in the first part 11, the positional relationship between the valve seat 2 and the float seats is greatly affected by attachment accuracy of the first part 11 and the second part 12. On the other hand, in the configuration in which the valve seat 2 and the support 4 are disposed in the second part 12, the positional relationship between the valve seat 2 and the two float seats 42 is not affected by the attachment accuracy of the first part 11 and the second part 12. If the valve seat 2 and the two float seats 42 have high position accuracy before the second part 12 is attached to the first part 11, the valve seat 2 and the two float seats 42 maintain high position accuracy after the second part 12 is attached to the first part 11. In addition, since the second part 12 and the support 4 are made of a single member in this example, the positional relationship between the valve seat 2 and the two float seats 42 is maintained with high accuracy.

To achieve three-point support of the float 3 by the valve seat 2 and the two float seats 42 in the configuration in which the second part 12 includes both the valve seat 2 and the support 4, the two float seats 42 need to be located at some distance from the valve seat 2 (specifically, at a position at which a triangle that can support the float 3 with stability is formed by the valve seat 2 and the two float seats 42). Since the base 41 is disposed in the second part 12 in a cantilever manner, a distance can be easily obtained between the valve seat 2 and the two float seats 42. In this case, in a conceivable configuration, the float seat is disposed in each of two beams extending from the second part 12 in a cantilever manner Cantilever members tend to be less rigid. On the other hand, in the valve device 100, the base 41 extending from the second part 12 in a cantilever manner has the frame shape, and the two float seats 42 are disposed in the base 41. Since the base 41 has the frame shape, the base 41 has higher rigidity than those of simple beams. Accordingly, even in the configuration in which the base 41 is disposed in the second part 12 in a cantilever manner, the positions of the float seats 42 can be maintained with high accuracy.

In addition, the base 41 include the two arms 44 extending from the second part 12, and the plate 45 coupling the two arms 44. The float seats 42 are disposed in each of the two arms 44, and the arms 44 are thicker than the plate 45. Accordingly, rigidity of a portion of the base 41 where the float seats 42 are disposed (i.e., the arms 44) can be increased, and the positions of the float seats 42 can be maintained with higher accuracy. Furthermore, the plate 45 is coupled to the entire area of each of the arms 44 in the extension direction. Accordingly, rigidity of the entire base 41 is increased, and the positions of the float seats 42 can be maintained with higher accuracy.

In addition, in the configuration in which the cantilever member extends from the second part 12, the base 41 includes the opening 43 so that the float 3 can be seated on the valve seat 2 and the two float seats 42 with stability.

Specifically, to cause the float 3 to descend and be seated on the valve seat 2 and further the float seats 42 with stability, waves of drain occurring when the amount of drain in the valve chamber 14 decreases are preferably small. Since the base 41 including the opening 43 extends from the second part 12 into the valve chamber 14, waves of drain can be reduced. That is, since the base 41 includes the opening 43, drain can pass through the opening 43 around the base 41. The base 41 serves as a larger distribution resistance in the valve chamber 14, and can moderate a flow of drain around the base 41. Accordingly, waves of drain are reduced. As a result, swing of the float 3 is reduced when the float 3 approaches the valve seat 2 and the two float seats 42 so that the float 3 can be thereby seated on the valve seat 2 and the two float seats 42 with stability.

In addition, since the float seats 42 are disposed in the base 41, the base 41 is disposed below the float 3. Thus, when the float 3 approaches the valve seat 2 and the two float seats 42, the liquid level of drain also approaches the base 41. The effect of reducing waves of drain by the base 41 serving as a distribution resistance increases as the base 41 approaches the liquid level of drain. The necessity for reducing drain waves also increases when the drain amount decreases and the float 3 approaches the valve seat 2 and the two float seats 42. That is, the base 41 can reduce drain waves more effectively when necessary. As a result, the float 3 can be seated on the valve seat 2 and the two float seats 42 with stability.

In addition, since the base 41 is opposed to the bottom wall 18 and forms a gap between the base 41 and the bottom wall 18, space above the base 41 and space below the base 41 communicate with each other through the opening 43. Thus, the amount of drain distributed between the base 41 and the bottom wall 18 increases. The base 41 and the bottom wall 18 serve as distribution resistance of drain distributed between the base 41 and the bottom wall 18. That is, when the amount of drain distributed between the base 41 and the bottom wall 18 increases, a flow of drain becomes gentler, and waves of drain are further reduced.

As described above, the valve device 100 includes: the casing 1 including the valve chamber 14; the valve seat 2 disposed in the valve chamber 14 and including the valve hole 21; the float 3 disposed in the valve chamber 14 and movable in accordance with an amount of drain in the valve chamber 14 to thereby open and close the valve hole 21; and the support 4 supporting the float 3 in a state of being seated on the valve seat 2 and closing the valve hole 21, the support 4 includes the base 41 including the opening 43 and having a frame shape and the two float seats 42 disposed in the base 41, and the float 3 in a state of being seated on the valve seat 2 and closing the valve hole 21 is seated on the two float seats 42.

With this configuration, the float 3 in the state of closing the valve hole 21 is supported at three points by the valve seat 2 and the two float seats 42. Since the base 41 on which the two float seats 42 are disposed has the frame shape, the base 41 has high rigidity. Thus, the positions of the two float seats 42 are maintained with high accuracy. As a result, the positional relationship between the valve seat 2 and the two float seats 42 is also maintained with high accuracy, and stability in seating the float 3 on the valve seat 2 can be enhanced. In addition, since the base 41 includes the opening 43, drain can be distributed through the opening 43 so that the function of the base 41 as a distribution resistance increases. Accordingly, the base 41 can reduce waves of drain, and swing of the float 3 occurring when the float 3 is seated on the valve seat 2 and the two float seats 42 is reduced. As a result, stability in seating the float 3 on the valve seat 2 can be further enhanced.

The casing 1 has the divided structure including the first part 11 and the second part 12, the first part 11 and the second part 12 define the valve chamber 14, the valve seat 2 is disposed in the second part 12, and the base 41 is disposed in the second part 12 in a cantilever manner.

With this configuration, since both the valve seat 2 and the base 41 are disposed in the second part 12, the positional relationship between the valve seat 2 and the two float seats 42 is maintained with high accuracy without an influence of accuracy in attaching the first part 11 and the second part 12. In addition, since the base 41 is disposed in the second part 12 in a cantilever manner, a distance can be easily obtained between the valve seat 2 and the two float seats 42. Even in the configuration in which the base 41 is disposed in the second part 12 in a cantilever manner, since the base 41 has the frame shape, position accuracy of the two float seats 42 can be obtained.

In addition, the first part 11 includes the opening 14a in which the valve chamber 14 is open sideways, and the second part 12 is attached to the first part 11 to close the opening 14a.

In this configuration, the configuration in which the base 41 is disposed in the second part 12 in a cantilever manner is especially effective. By employing the configuration in which the base 41 is disposed in the second part 12 in a cantilever manner, the configuration in which the two float seats 42 are disposed in the valve chamber 14 can be easily obtained.

The casing 1 includes the ceiling wall 17, the bottom wall 18, and the peripheral wall 19 coupling the ceiling wall 17 and the bottom wall 18 to each other. The first part 11 includes the ceiling wall 17, the bottom wall 18, and a portion of the peripheral wall 19. The ceiling wall 17, the bottom wall 18, and the peripheral wall 19 define the valve chamber 14. The second part 12 includes a remaining portion of the peripheral wall 19. The portion of the peripheral wall 19 included in the first part 11 includes the opening 14a. The base 41 is opposed to the bottom wall 18 and forms a gap between the base 41 and the bottom wall 18.

With this configuration, the base 41 disposed in the second part 12 in a cantilever manner is opposed to the bottom wall 18 included in the first part 11. A gap is present between the base 41 and the bottom wall 18. Since the base 41 includes the opening 43, drain is distributed through the opening 43 between the space above the base 41 and the gap between the base 41 and the bottom wall 18. In the gap between the base 41 and the bottom wall 18, the base 41 and the bottom wall 18 serve as distribution resistance. Thus, a flow of drain around the base 41 becomes gentler, and waves of drain are further reduced. As a result, swing of the float 3 is further reduced so that stability in seating the float 3 on the valve seat 2 can be thereby further enhanced.

Other Embodiments

In the foregoing description, the embodiments have been described as an example of the technique disclosed in the present application. The technique disclosed here, however, is not limited to these embodiments, and is applicable to other embodiments obtained by changes, replacements, additions, and/or omissions as necessary. Components described in the above embodiments may be combined as a new exemplary embodiment. Components included in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

For example, the valve device 100 is not limited to the drain trap. It is sufficient that the valve device 100 is a float-type valve device including a float.

Although the valve device 100 is connected to the vertical pipe such that the inlet 13 and the outlet 16 of the casing 1 are open in the top-bottom direction in the embodiment described above, the technique disclosure here is not limited to this embodiment. The valve device 100 may be connected to a horizontal pipe with the inlet 13 and the outlet 16 being open laterally.

Although the base 41 includes the two arms 44 and the plate 45 in the embodiment described above, the technique disclosure here is not limited to this embodiment. The base 41 may be made of a frame body having a uniform thickness. Alternatively, in the base 41, the two arms 44 do not need to be entirely coupled to each other by the plate 45, the tips of the two arms 44, for example, may be coupled to each other by a beam-like member.

The positions of the float seats 42 are not limited to the tip of each of the arms 44. As long as the three-point support of the float 3 is achieved by the valve seat 2 and the two float seats 42, that is, as long as a triangle is formed by the valve seat 2 and the two float seats 42, the float seats 42 can be disposed at any positions in the base 41. For example, in the base 41 described above, the float seats 42 may be disposed in the plate 45.

What is claimed is:

1. A valve device comprising:
   a casing including a valve chamber;
   a valve seat disposed in the valve chamber and including a valve hole:
   a float disposed in the valve chamber and movable in accordance with an amount of drain in the valve chamber to thereby open and close the valve hole; and a support supporting the float in a state of being seated on the valve seat and closing the valve hole, wherein the support includes a base including a through bore located in the valve chamber and having a frame shape and two float seats disposed in the base, the float in the state of being seated on the valve seat and closing the valve hole being seated on the two float seats.

2. The valve device according to claim 1, wherein the casing has a divided structure including a first part and a second part, the first part and the second part define the valve chamber, the valve seat is disposed in the second part, and the base is disposed in the second part in a cantilever manner.

3. The valve device according to claim 2, wherein the first part includes an opening in which the valve chamber is open sideways, and the second part is attached to the first part to close the opening.

4. The valve device according to claim 3, wherein the casing includes a ceiling wall, a bottom wall, and a peripheral wall coupling the ceiling wall and the bottom wall to each other, the ceiling wall, the bottom wall, and the peripheral wall defining the valve chamber, the first part includes the ceiling wall, the bottom wall, and a portion of the peripheral wall, the second part includes a remaining portion of the peripheral wall, the portion of the peripheral wall included in the first part includes the opening, and the base is opposed to the bottom wall and forms a gap between the base and the bottom wall.

* * * * *